United States Patent
de Nanclares et al.

(10) Patent No.: US 6,885,161 B2
(45) Date of Patent: Apr. 26, 2005

(54) ELECTRONIC DEVICE FOR CONTROLLING A SYNCHRONOUS MOTOR WITH PERMANENT-MAGNET ROTOR

(75) Inventors: Eduardo Beltrán de Nanclares, Mondragon (ES); José M. Mitxelena Alzuri, Mondragon (ES)

(73) Assignee: Fagor, S. Coop., Mondragon (ES)

( * ) Notice: Subject to any disclaimer, the term of this patent is extended or adjusted under 35 U.S.C. 154(b) by 17 days.

(21) Appl. No.: 10/461,762

(22) Filed: Jun. 12, 2003

(65) Prior Publication Data

US 2003/0230999 A1 Dec. 18, 2003

(30) Foreign Application Priority Data

Jun. 18, 2002 (ES) .......................................... 200201408

(51) Int. Cl.⁷ ................................................ H02P 6/20
(52) U.S. Cl. ...................... 318/254; 318/430; 318/721
(58) Field of Search ................................ 318/138, 254, 318/430, 431, 437, 439, 720–722, 724

(56) References Cited

U.S. PATENT DOCUMENTS

| | | | | | |
|---|---|---|---|---|---|
| 3,529,220 A | * | 9/1970 | Kobayashi et al. | ......... | 318/138 |
| 4,769,581 A | * | 9/1988 | Rilly | ........................... | 318/254 |
| 4,780,652 A | * | 10/1988 | Rilly | ........................... | 318/254 |
| 5,675,226 A | * | 10/1997 | Riola' | ......................... | 318/439 |
| 6,081,092 A | * | 6/2000 | Alvaro et al. | ................ | 318/700 |
| 6,225,775 B1 | * | 5/2001 | Alvaro et al. | ................ | 318/727 |
| 6,239,563 B1 | * | 5/2001 | Kunz | ........................... | 318/254 |

* cited by examiner

Primary Examiner—Bentsu Ro
(74) Attorney, Agent, or Firm—The Kline Law Firm

(57) ABSTRACT

Electronic device for controlling a synchronous motor with permanent-magnet rotor, comprising an alternating voltage current source at mains frequency connected in series with said synchronous motor (1), at least one static switch (2) connected in series with said synchronous motor (1), and an electronic circuit (3) that acts on said static switch (2). Said electronic circuit (3) determines the timing for the firing of the static switch (2) taking as reference the zero-crossing of the mains voltage (Vr) and applying a firing time (Td) starting from said reference, said firing time (Td) being obtained as a function of the position of the rotor (1A) of the motor (1) in the previous half-cycles.

14 Claims, 2 Drawing Sheets

US 6,885,161 B2

ELECTRONIC DEVICE FOR CONTROLLING A SYNCHRONOUS MOTOR WITH PERMANENT-MAGNET ROTOR

TECHNICAL FIELD

The present invention relates to the control of synchronous motors with a permanent-magnet rotor.

PRIOR ART

Synchronous motors with permanent-magnet rotors fed from the mains voltage are known. Applying said voltage to the motor generates a magnetic field between the poles of the stator of said motor, which turns the rotor of the motor over.

For example, in the case of a motor with two stator poles and two rotor poles, when the rotor reaches synchronisation speed, i.e. in a permanent regime, the angular positions of the rotor, from 0° to 180° (a half turn) coincide with a given polarity of the current (current half-cycle), and the angle positions from 180° to 360° (the remaining half turn) coincide with the other current polarity (the following half-cycle of the current). In practice, phase shifts occur between the position of the rotor and the current signal, so that part of the current, rather than helping to drive the rotor, produces a braking effect which is greater the lesser the load. This causes unnecessary overheating of the motor, undesired vibrations and noise.

On the other hand, starting is a problem with this type of motor. EP 0 574 823 B1 discloses an electronic device for starting synchronous motors which comprises a switch in series with the synchronous motor, an alternating voltage current source also connected in series with said synchronous motor, and an electronic circuit acting on said switch. The electronic circuit operates on the switch when the current flowing through the stator is approximately zero and depending on the polarity of the alternating voltage and the position of the rotor. In this way, during startup the current is made to flow only when said current helps the rotation in a given direction until the rotor reaches the synchronisation speed. Once synchronisation speed is reached, the rotor can turn without involving any type of current control. The device described in EP 0 574 823 B1 does not solve the problem referring to the braking effect because of the phase shift between the rotor position and the current.

EP 0 682 404 B1 describes an electronic device for starting and controlling a synchronous motor with a permanent-magnet rotor comprising an alternating voltage current source at mains frequency connected in series with the synchronous motor, a static switch connected in series with said synchronous motor, and an electronic circuit which acts on said static switch. Said electronic circuit acts on the switch depending on the position of the rotor and the voltage applied to said switch. The possibility is contemplated of modifying the synchronisation speed with the introduction of delay periods in the switch firing times. No form of control is contemplated to minimise the phase shifts produced between the rotor position and the current.

DESCRIPTION OF THE INVENTION

The main object of the invention is to provide an electronic device to control a synchronous motor that is simple and economical, and that makes it possible to reduce the current used, thereby reducing motor heating and also consumption.

Another object of the invention is to provide an electronic device that also makes it possible to reduce the vibration of the motor under no load, with the resulting reduction of noise and consequent prolongation of the life of the motor.

The electronic device of the invention comprises an alternating voltage current source at mains frequency connected in series with said synchronous motor, at least one static switch connected in series with said synchronous motor, and an electronic circuit which acts on said static switch. The electronic circuit determines the timing of the firing of the static switch, taking as reference the zero-crossing of the mains voltage and applying a firing time starting from said reference, said firing time being obtained according to the position of the rotor of the motor in the previous half-cycles. In this way, it is possible to minimise the braking produced by the phase shift between the rotor position and the current flowing thought the motor stator, so reducing heating and consumption.

The mains voltage is taken as reference signal because it is very stable, not subject to variations caused by the actual operation of the device, as happens for example with the voltage in the switch.

By means of the control according to the rotor position in previous half-cycles, the operation of the motor is made stable. That would not be possible if the firing time was calculated just as a function of the position of the rotor in the previous half-cycle since, to do that, it would also be necessary to know the speed of the rotor.

In the electronic device of the invention, the electronic circuit can choose the direction of turn of the rotor. To do this, said electronic circuit takes account of the values of the polarity of the mains voltage and the rotor position, so as to fire the static switch at the firing times calculated, provided that these values are such as to help rotation in the direction chosen.

Correction of the phase shift between the position of the rotor and the current at a given time is therefore done by obtaining the firing time of each half-cycle according to the phase shift that existed between the current and the rotor position in the previous half-cycles. One way to obtain said firing time is to calculate the phase shifts arising between the current flowing through said motor and the position of the rotor of the motor. Rather than directly measuring the current, the voltage in the switch can be measured. In this solution, the electronic circuit needs three data: the mains voltage, the current value (or else the voltage in the switch) and the position of the rotor.

On the other hand, it has been proved that there is a correlation between the relative position of the rotor with respect to the current signal and the relative position of the rotor with respect to the mains voltage signal. Therefore, a second way of obtaining the firing time is to calculate phase shifts arising between the position of the rotor of the motor and the mains voltage. This second solution has the additional advantage that the electronic circuit needs only two data: the position of the rotor and the mains voltage.

In various load situations, particularly unloaded, it may happen that, at a given moment, the time the rotor of the motor takes to make a half turn is less than the mains voltage half-cycle. In these circumstances, a delay is applied to the previously calculated firing time. As a result, the rotor does not reach a speed in excess of that required, so that the current cycles are far more even, with a considerable reduction in vibration and noise.

These and other objects of the invention will be made clearer in the light of the figures and the detailed disclosure of the invention.

DETAILED DISCLOSURE OF THE INVENTION

Figure 1:
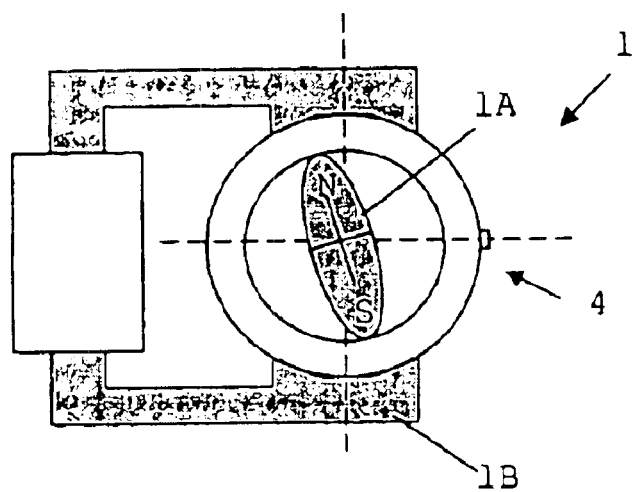
FIG. 1 is a schematic view of a synchronous motor with a permanent-magnet rotor.

With reference to FIG. 1, the electronic device of the invention is applied to a permanent-magnet synchronous motor 1 with a rotor 1A and a stator 1B. Said motor 1 has two rotor poles and two stator poles, and is shown purely by way of an example.

Figure 2:
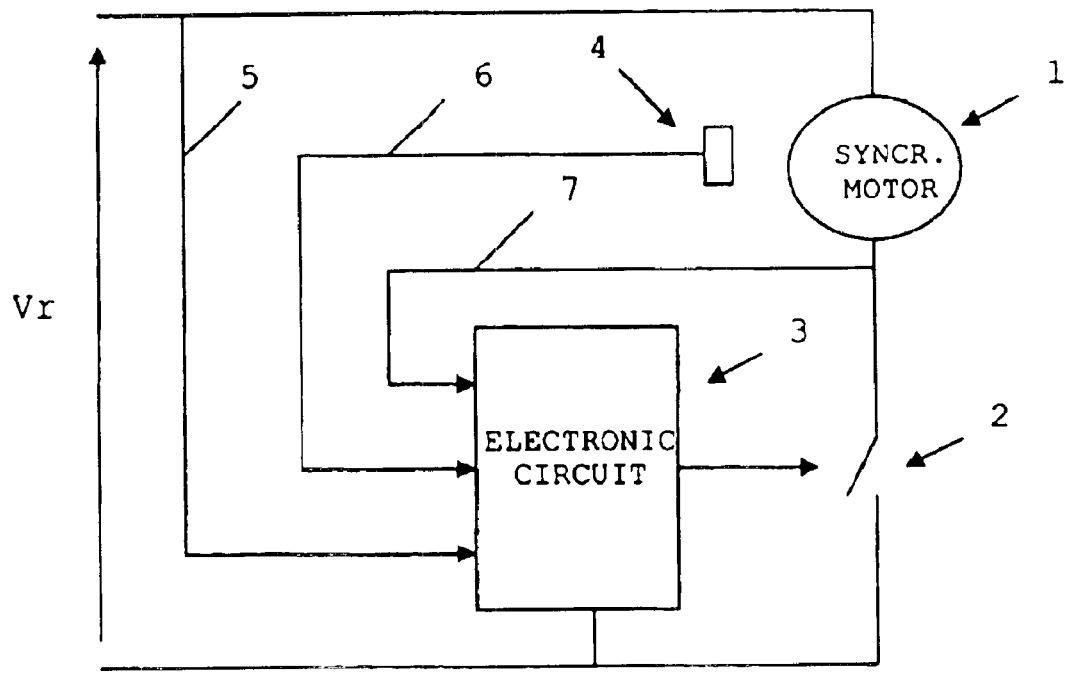
FIG. 2 is a block diagram of an embodiment for the control device of the invention.

With reference to FIG. 2, the electronic device for controlling said synchronous motor 1 comprises:

- an alternating voltage source at mains frequency providing a voltage Vr, connected in series with said synchronous motor 1,
- a static switch 2 connected in series with said synchronous motor 1 and comprising for example a triac, and
- an electronic circuit 3 which acts on said static switch 2.

Said electronic circuit 3 determines the timing for firing the static switch taking as reference the zero-crossing of the mains voltage Vr and applying a firing time Td starting from said reference, said firing time Td being obtained as a function of the position of the rotor 1A of the motor 1 in the previous half-cycles.

The electronic circuit 3 can choose the direction of rotation of the rotor 1A of the motor 1. To do that, said electronic circuit 3 takes account of the polarity values of the mains voltage Vr and the position of the rotor 1A, so that the static switch 2 fires at the firing times calculated, provided that said values are such as to contribute to the rotation in the direction chosen.

Figure 3:
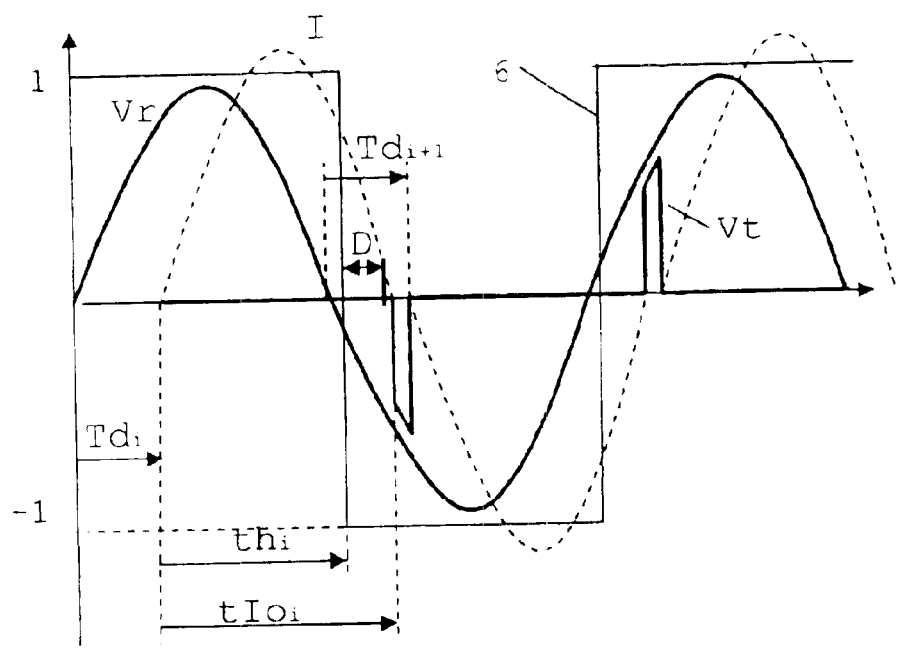
FIG. 3 shows the variations in time of the mains voltage, the signal from the rotor position sensor and the voltage in the switch in a first embodiment of the invention.

For example, with reference to FIG. 3, in the case of motor 1 in FIG. 1, taking account of the mains voltage Vr and a signal 6 representing the position of the rotor 1A supplied by a position sensor 4, if it is wished for the rotor 1A to turn to the left (anticlockwise), switch 2 receives a firing signal when:

(Vr=Positive) and (Signal 6=−1)

Or else when:

(Vr=Negative) and (Signal 6=1)

Should either of these combinations arise, switch 2 will receive a firing signal once the corresponding time Td has passed after zero-crossing of the mains voltage Vr.

However, if it is wished for the rotor 1A to turn right (clockwise), switch 2 will receive a firing signal when:

(Vr=Positive) and (Signal 6=1)

Or else when:

(Vr=Negative) and (Signal 6=−1)

In a first embodiment of the invention, the electronic circuit 3 calculates the firing time Td according to the phase shifts between the current flowing through the motor 1 and the position of the rotor 1A in the previous half-cycles. The electronic circuit 3 calculates the phase shifts produced between the current flowing through the motor 1 and the rotor 1A measuring the phase shifts between the voltage in the static switch 2 received along line 7, and the signal 6 from a position sensor 4 adapted to detect the position of the rotor 1A of the motor 1 (e.g. a Hall effect sensor).

It would in principle be ideal for the phase shift between the current signal and the position of the rotor to be zero, since that would imply that the braking effect would also be zero, so obtaining the lowest consumption level. However, in that situation the motor is deprived of reaction capacity, and a shift of load may lead to a loss of synchronisation speed. Therefore, in practice, the control consists of maintaining a phase shift that, as a maximum, equals a predetermined constant value D. In this way, if the phase shift is greater than said value D, said phase shift will tend to approach value D. No action is implemented on the phase shift when it is less than said value D.

Therefore, for each half-cycle, the electronic circuit 3 calculates the phase shift between the Vt voltage in the static switch 2 (considering the moment at which said voltage Vt appears), and the signal 6 of the position sensor 4, then subtracting from said phase shift the constant phase shift D. The sum of the subtractions obtained is divided by a whole constant value k. With reference to FIG. 3, for each half-cycle, the phase shift tr between the current signal (represented by the letter I in FIGS. 3 and 4) and signal 6 indicating the position of the rotor 1A will be as follows:

$$tri = tlo_i - th_i$$

And the firing time Td for a given half-cycle i is calculated as follows:

$$Td_i = \frac{1}{k}\sum_{x=1}^{i-1}(tr_x - D)$$

It is seen that the sum of all the subtractions is divided by a value k. The value of k is constant, and is sufficiently large for the dynamics to be slow enough to ensure that operation is stable.

If for firing time Td a value is obtained of less than zero, it is considered that Td=0.

It is also possible to represent the firing time Td for a given half-cycle depending on the firing time in the previous half-cycle, corrected according to the phase shifts in the remaining half-cycles:

$$Td_{i+1} = Td_i + \frac{1}{k}(tlo_i - th_i - D)$$

In this configuration, the electronic circuit 3 acts on the switch 2 according to three signals: the mains voltage Vr received along line 5, the signal 6 from the position sensor 4, and the voltage Vt in the switch 2, received along line 7.

Because of the correlation between the phase shift between the position of the rotor 1A and the current signal I, and the phase shift between the position of the rotor 1A and the mains voltage Vr, in a second embodiment of the invention, the electronic circuit 3 calculates the firing time Td as a function of the phase shifts produced between the position of the rotor 1A of the motor 1 and the mains voltage Vr in the previous half-cycles. In this case, the position of the rotor 1A of the motor 1 is also measured from the signal 6 from a position sensor 4.

In this second embodiment, a constant phase shift D is also considered. In this case, the control consists of maintaining as a minimum a phase shift of D. In this way, if the phase shift is less than said value D, said phase shift will tend to approach value D, with no action being taken on the phase shift when it is greater than said value D.

Figure 4:
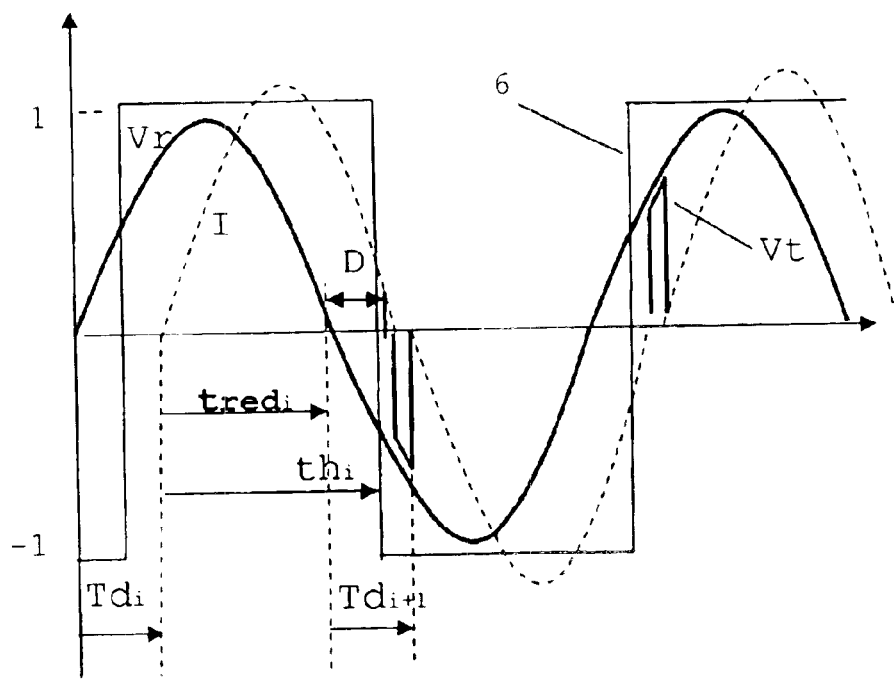
FIG. 4 shows the variations in time of the mains voltage, the signal from the rotor position sensor and the voltage in the switch in a second embodiment of the invention.

With reference to FIG. 4, the phase shift tr between the signal 6 giving the position of the rotor 1A and the mains voltage Vr will, for a half-cycle i, be as follows:

$$tri = thi - tredi$$

And the firing time Td for a given half-cycle i is calculated, as for the first embodiment, as follows:

$$Td_i = \frac{1}{k} \sum_{x=1}^{i-1} (D - tr_x)$$

We can also represent firing time Td for a given half-cycle according to the firing time in the previous half-cycle, corrected according to the phase shifts in the remaining half-cycles:

$$Td_{i+1} = Td_i + \frac{1}{k}(tred_i - th_i + D)$$

In this configuration, the electronic circuit 3 acts on the switch 2 in accordance with two signals: the mains voltage Vr and signal 6 from the position sensor 4, voltage Vt at switch 2 not being necessary.

In both embodiments, the reaction capacity of the motor 1 depends on the values of D and k selected. Thus, for example, for the first embodiment, with a given value of k calculated so that the system is stable, a higher D value implies enhanced reaction capacity and less power saving, while a lower value for D implies on the contrary less reaction capacity and greater power saving. For the second embodiment just the contrary occurs.

In practice, the idea is to reach a compromise when calculating the k and D values. Simple tests can be used to determine optimal k and D values which depend, among other factors, on the characteristics of the motor 1. The constant k can, for example, have a value of the order of 100, and the value of D may, for a k value of said order, fall between 0 and 2.5 ms.

During the operation of motor 1 under no or very little load, current cycles greater than normal appear with a certain periodicity. The reason for said greater current cycles is the advance of the rotor 1A, which causes the phase of the counterelectromotive force to advance with respect to the mains voltage Vr, so that the effective voltage applied to the stator 1B increases substantially, producing such elevated current cycles and, consequently, powerful braking, which causes vibrations. With the device of the invention, this is solved by introducing a compensation algorithm by which a delay δ is applied to the firing time Td when the time taken by the rotor 1A to rotate through half a turn, trot, is less than the time Tred of a half-cycle of the mains voltage Vr. Said delay δ equals the difference between time Tred and time trot. Therefore:

If Tred>troti δi+1=Tred−troti

If Tred<troti δi+1=0

With the inclusion of said delay δ, the current cycles are much more regular under no load or minimum load, and vibration is reduced considerably. Increased stability due to the introduction of the compensation makes it possible to reduce the value of k by a factor of 10, thereby significantly improving the reaction capacity of the motor 1, so that lower D phase shifts with good reaction capacity can be used.

With the addition of the compensation, all that has to be taken into account is that the time to apply in each half-cycle following the zero-crossing of the mains voltage signal Vr will, instead of Td, be Td +δ in those cases where the delay δ effectively has to be applied. The calculation of subsequent Td firing times does not take account of the delay δ compensations which may have been applied in previous half-cycles.

In the embodiments described, as shown in FIG. 1, there is a single position sensor 4 and is placed at the central point of the free space between the poles of stator 1B of the motor 1, i.e. on the axis perpendicular to the magnetic axis created by stator 1B. In this way, the aim is, with a single location for the position sensor 4, to be able to start in one direction or the other depending on the rotation direction chosen.

Because of the constructive characteristics of the motor 1, when rotor 1A is stopped, said rotor 1A is situated at an angle slightly off the magnetic axis of stator 1B, in its rest position. In said position, startup in one direction (to the left in the case in FIG. 1) raises no problems, but with startup in the other direction (in the case in FIG. 1 to the right) a block is produced. That is because one current half-cycle does not give the rotor 1A sufficient impulse to change the polarity read by the position sensor 4, so that, in the following half-cycle, the electronic circuit 3 does not act on switch 2 and rotor 1A returns to its rest position, and the same process is repeated in the following half-cycles.

To prevent this block, on initiating startup of the motor 1, the electronic device 3 of the invention fires the static switch 2 during several cycles without control (a situation equivalent to a direct connection to the mains voltage Vr) to force the rotor 1A to move from its rest position. It then begins to calculate the firing times based on the Td firing times and to fire the static switch 2 according to those Td firing times, depending on the direction of turn selected, the polarity of the mains voltage Vr and position of rotor 1A.

With the current applied at the outset, the rotor 1A can be moved from its position so as acquire sufficient inertia to begin to turn in a given direction. Should rotor 1A have begun to turn in the direction opposite to the one intended, the control applied will brake it in that direction, until it stops and it begins turning in the direction chosen.

It may be that, after beginning startup, the rotor 1A returns to its rest position and is still unable to turn. Therefore, if the time during which rotor 1A polarity remains the same exceeds a certain value, the startup is initiated once more.

What is claimed is:

1. An electronic device for controlling a synchronous motor with a permanent-magnet rotor comprising:
    an alternating voltage current source at mains frequency connected in series with said synchronous motor;
    at least one static switch connected in series with said synchronous motor; and
    an electronic circuit acting on said static switch, wherein said electronic circuit calculates the firing instants for the static switch for each half-cycle, taking as reference the zero-crossing of the mains voltage and applying a firing time starting from said reference, said firing time being the firing time of the previous half-cycle corrected according to the position of the rotor with respect to the current flowing through the motor in the previous half-cycle.

2. An electronic device according to claim 1, wherein the electronic circuit determines the direction of rotation of the rotor according to the polarity of the mains voltage and the position of the rotor, firing the static switch, at the firing instants calculated, provided that the values of the mains voltage and the position of rotor are such as to help rotation in the direction chosen.

3. An electronic device according to claim 2, wherein the electronic circuit calculates the firing time by correcting the firing time of the previous half-cycle according to the phase shift produced between the current flowing through the motor and the position of the rotor of the motor in the previous half-cycle.

4. An electronic device according to claim 3, wherein the electronic circuit determines the firing time at a given instant i calculated by the following formula:

$$Td_i = \frac{1}{k}\sum_{x=1}^{i-1}(tr_x - D)$$

where $tr_x$ is the phase shift between the current in the static switch and the position of the rotor in a given half-cycle x, D is a predetermined constant phase shift and k is a given constant value, so that the firing time at a given instant i+1 is the firing time of the previous half-cycle i corrected according to the following formula:

$$Td_{i+1} = Td_i + \frac{1}{k}(tr_i - D).$$

5. An electronic device according to claim 4, wherein the electronic circuit calculates the phase shifts produced between the current flowing through motor and the position of the rotor of the motor, measuring the phase shifts between the voltage in the static switch and the signal from a position sensor adapted to detect the position of the rotor of the motor.

6. An electronic device according to claim 5, wherein the position sensor is placed at the central point of the free space between the poles of the stator of the motor.

7. An electronic device according to claim 2, wherein the electronic circuit calculates the firing time by correcting the firing time of the previous half-cycle according to the phase shift produced between the position of the rotor of the motor and the mains voltage in the previous half-cycle.

8. An electronic device according to claim 7, wherein the electronic circuit calculates the firing time in a given instant i using the following formula:

$$Td_i = \frac{1}{k}\sum_{x=1}^{i-1}(D - tr_x)$$

where $tr_x$ is the phase shift between the position of the rotor and the mains voltage in a given half-cycle x, D is a predetermined constant phase shift, and k is a given constant value, so that the firing time at a given instant i+1 is the firing time of the previous half-cycle i corrected according to the following formula:

$$Td_{i+1} = Td_i + \frac{1}{k}(tr_i - D).$$

9. An electronic device according to claim 8, wherein the position of rotor of the motor is measured from the signal from a position sensor.

10. An electronic device according to claim 9, wherein the position sensor is placed at the central point of the free space between the poles of the stator of the motor.

11. An electronic device according to claim 1, wherein, on initiating startup of the motor, the electronic circuit fires the static switch during several cycles, without control, to cause the rotor to move from its rest position, and then begins to calculate the firing instants based on the firing times, and to fire the static switch depending on said firing times.

12. An electronic device according to claim 11, wherein if, following initiation of the startup, the time during which the rotor polarity remains the same exceeds a predetermined value, said startup is initiated once more.

13. An electronic device according to claim 1, wherein, when the time taken by the rotor of the motor to rotate a half turn is less than the time of one half-cycle of the mains voltage, a delay is applied to the firing time.

14. An electronic device according to claim 13, wherein said delay equals the difference between the time of one half-cycle of the mains voltage and the time taken by the rotor of the motor to rotate a half turn.

* * * * *